United States Patent Office 2,971,988
Patented Feb. 14, 1961

2,971,988

METAL-AMIDE ALCOHOLATES AND PROCESS OF PREPARATION

Fred N. Hill, South Charleston, and Frederick E. Bailey, Jr., and John T. Fitzpatrick, Charleston, W. Va., assignors to Union Carbide Corporation, a corporation of New York No Drawing. Filed Dec. 29, 1958, Ser. No. 783,106

13 Claims. (Cl. 260—632)

This invention relates to a process for polymerizing epoxide monomers, to the products resulting therefrom, and to the catalysts employed in said process.

This application is a continuation-in-part of application Serial No. 587,955, entitled "Polymerization of Epoxides and New Products Obtained Thereby," by F. N. Hill, J. T. Fitzpatrick, and F. E. Bailey, Jr., filed May 29, 1956, now abandoned, and application Serial No. 674,308, entitled "Epoxide Polymerization and Compounds Therefor," by F. N. Hill, J. T. Fitzpatrick, and F. E. Bailey, Jr., filed July 26, 1957, now abandoned, both of the above-identified applications being assigned to the same assignee as the instant application.

In one aspect the instant invention is directed to the process for polymerizing epoxide monomers which contain a cyclic group composed of two carbon atoms and one oxygen atom in contact with a catalytically significant quantity of metal amide-alcoholate, or metal hexammoniate, or mixture of metal amide and metal-amide alcoholate catalysts described hereinafter to produce useful polymers. In another aspect the instant invention is directed to the process for preparing certain divalent metal amide-alcoholates, either alone or in admixture with the corresponding divalent metal amide, which are highly useful as catalysts in the polymerization of epoxide monomers, notably olefin oxides to be described hereinafter. In a further aspect the instant invention is directed to the novel catalysts resulting from the aforementioned process.

It is deemed appropriate at this time to define the term "reduced viscosity" since this term will be frequently employed throughout the specification. By the term "reduced viscosity," as used herein including the appended claims, is meant a value obtained by dividing the specific viscosity by the concentration of the polymer in the solution, the concentration being measured in grams of polymer per 100 milliliters of solvent at a given temperature, and it is regarded as a measure of molecular weight. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., acetonitrile, at 30° C.

The catalyst classes of the instant invention which have been found to be effective in polymerizing epoxide compounds to useful polymers are certain divalent metal hexammoniates and divalent metal amide-alcoholates. The divalent metal amide-alcoholates can be represented as follows:

(I)    $H_2N-M-OR$ wherein M is a divalent metal which has an atomic number greater than 4 and less than 57 from group II of the periodic table, i.e., magnesium, calcium, zinc, strontium, cadmium, and barium; and wherein R is a monovalent organic radical, preferably a monovalent hydrocarbon radical, e.g., alkyl, cycloalkyl, aryl, alkaryl, aralkyl, alkenyl, and the like. Representative R radicals include, among others, methyl, ethyl, propyl, isopropyl, butyl, isobutyl, t-butyl, 2-ethylhexyl, 2,4,4-trimethylpentyl, decyl, dodecyl, cyclopentyl, cyclohexyl, 2-methylcyclopentyl, 3-amylcyclohexyl, phenyl, benzyl, tolyl, ethylphenyl, hexylphenyl, octylphenyl, phenethyl, phenylpropyl, phenylbutyl, allyl, 3-butenyl, 3-pentenyl, and the like. In addition, the R radical can contain unreactive groups or atoms, or groups which do not materially affect the polymerization reaction, e.g., sulfones, alkoxy, aryloxy, aromatic nitro groups, and the like. In a preferred aspect the R variable is an alkyl radical which contains from 1 to 10 carbon atoms. It is further preferred that the divalent metal (M) be an alkaline earth metal, i.e., calcium, strontium, or barium. Of the alkaline earth metals calcium is highly preferred.

The divalent metal amide-alcoholate catalysts of this invention can be prepared by various novel routes. Explanation of the catalyst preparation will be facilitated by illustrating the various chemical equations involved. In these equations the metal will be exemplified by calcium, and the organic reactant will be designated as a specific compound be it an alcohol, an epoxide, or an aldehyde. It is to be understood, however, that other divalent metals can be employed instead of calcium, and other organic reactants can be used instead of the illustrated organic reactant as will be readily apparent from a consideration of this specification.

The reaction between an alkaline earth metal and ammonia gives alkaline earth metal hexammoniate. Preferably this reaction is effected by dissolving, for example, calcium metal in liquid ammonia, the product, i.e., calcium hexammoniate, being contained in the resulting blue ammonia solution. The chemical equation is as follows:

(II)    $Ca + 6NH_3 \text{ (liquid)} \rightarrow Ca(NH_3)_6$

When alkaline earth metal hexammoniate (protected from exposure to the atmosphere) is allowed to stand over an extended period of time, or is subjected to heat under the autogenous pressure of ammonia, or contacted with a catalyst, e.g., iron oxide, the corresponding amide is formed according to the following equation:

(III)    $Ca(NH_3)_6 \rightarrow Ca(NH_2)_2 + 4NH_3 + H_2$

It is to be noted that the metal hexammoniates and metal amides are rapidly destroyed upon exposure to air. Consequently, precaution should be taken not to expose the metal hexammoniates or metal amides to air during the preparation and/or storage of same, or during their use as reagents for the preparation of the metal amide-alcoholate catalysts.

The amides of magnesium, zinc, or cadmium can be prepared by other chemical routes. For instance, zinc amide or magnesium amide can be prepared by known methods such as by the reaction between potassium amide and the bromide of the appropriate metal, the reaction being carried out in liquid ammonia. The reaction, for example, of diethylzinc or diethylmagnesium with ammonia gives the corresponding metal amides and ethane as the products.

In one embodiment the alkaline earth metal amide-alcoholate catalysts can be prepared by the reaction of an epoxide compound, i.e., an epoxide compound which contains a cyclic group composed of two carbon atoms and one oxygen atom, with solid metal hexammoniate or with an ammonia solution of metal hexammoniate as shown in Equation IV below.

(IV)    $Ca(NH_3)_6 + H_2C\underset{O}{\overset{}{-\!\!\!-\!\!\!-}}CH_2 \longrightarrow H_2N-Ca-OC_2H_5 + 5NH_3$ In practice, the above reaction is most conveniently carried out by dissolving the metal in liquid ammonia followed by slow addition of the epoxide compound to the resulting agitated solution. The reaction can be conducted at a temperature in the range of from about −70° C., and lower, to about +30° C., and higher. In the event an inert vehicle (described below) is employed, the lower temperature limit is above the melting point of said vehicle. It is understood, of course, that whenever liquid ammonia is employed as a reactant and/or vehicle in the chemical equations depicted in this specification, the temperature of the liquid ammonia is below about −33.4° C. at atmospheric pressure, or the temperature and pressure are correlated to thus essentially maintain the ammonia in the liquid state. Alternatively, ammonia can be reacted with alkaline earth metal contained in an inert, normally-liquid organic vehicle such as lower dialkyl ether of alkylene glycol, for example, the dimethyl, diethyl or dipropyl ethers of diethylene glycol, and the like; dioxane; saturated aliphatic and cycloaliphatic hydrocarbons, e.g., hexane, heptane, cyclohexane, and the like. When this procedure is followed the alkaline earth metal is added to the inert vehicle while agitating the resulting mixture. Subsequently, ammonia is slowly added to this mixture while maintaining a reaction temperature preferably below about 10° C. to assure formation of the metal hexammoniate. After this, the metal hexammoniate suspension in the inert vehicle can be reacted with the desired epoxide compound to form the metal amide-alcoholate.

With reference to Equation IV supra particularly desirable epoxide reagents are those containing solely oxirane oxygen, carbon, and hydrogen, or solely oxirane oxygen, etheric oxygen, carbon, and hydrogen, said epoxide reagents containing a cyclic group composed of two carbon atoms and one oxygen atom which can be a terminal cyclic group or an internal cyclic group. Illustrative epoxides include, for example, ethylene oxide, propylene oxide, 1,2-epoxybutane, 2,3-epoxybutane, isobutylene oxide, the epoxypentanes, the epoxyhexanes, the epoxyoctanes, the epoxydecanes, 2,4,4 - trimethyl - 1,2-epoxypentane, 2,4,4-trimethyl-2,3 - epoxypentane, styrene oxide, cyclohexylepoxyethane, 1 - phenyl-1,2-epoxypropane, 1,1 - diphenylepoxyethane, 7 - oxabicyclo[4.1.0] heptane, 6 - oxabicyclo[3.1.0]hexane, 3-methyl - 6-oxabicyclo[3.1.0]hexane; the 2,3-epoxyalkyl alkyl ethers, e.g., 2,3-epoxypropyl methyl ether, 2,3 - epoxypropyl ethyl ether, 2,3 - epoxypropyl propyl ether, 2,3-epoxypropyl butyl ether, 2,3 - epoxypropyl 2 - ethylhexyl ether, 2,3-epoxybutyl ethyl ether, 2,3-epoxypentyl butyl ether; and the like. Preferred epoxide reagents are olefin oxides, i.e., compounds containing solely carbon, hydrogen, and oxirane oxygen bonded to vicinal or adjacent carbon atoms which form a terminal or internal cyclic group.

According to Equation IV, one mol of epoxide can react with one mol of metal hexammoniate to give the metal amide-alcoholate. It has been observed, however, that very active catalysts are obtained by reacting less than one mol of epoxide with one mol of metal hexammoniate. In such preparations the unreacted metal hexammoniate in the reaction product ultimately decomposes to the corresponding metal amide. The end result is a mixture of metal amide and metal amide-alcoholate which mixture, as indicated previously, is an exceedingly active catalyst for polymerizing epoxide monomers. Consequently, one aspect of this invention can be regarded as being directed to modifying or promoting an alkaline earth metal amide. Only trace amounts, e.g., 0.01 mol, or lower, of epoxide per mol of metal hexammoniate, are required in the reaction exemplified by Equation IV to give an ultimate reaction product (mixture of metal amide and metal amide-alcoholate) which exhibits greater catalytic activity than an aqual weight of the corresponding metal amide alone. From the range of trace amounts, e.g., 0.01 mol, to about 0.5 mol of epoxide per mol of metal hexammoniate the reaction product not only exhibits greater catalytic activity than the corresponding metal amide alone but also, this enhanced or increased catalytic activity is almost directly proportional to the amount of epoxide reacted with the metal hexammoniate. It should also be noted that the reaction of one mol of epoxide with one mol of metal hexammoniate gives catalysts which are superior in catalytic activity than the corresponding metal amide. In general, the reaction of from about 0.2 to about 0.6 mol of epoxide per mol of metal hexammoniate gives catalysts having optimum catalytic activity. Extremely active catalysts are produced by reacting approximately 0.5 mol of epoxide with 1.0 mol of metal hexammoniate. In passing, it should be noted that the use of more than one mol of epoxide per mol of metal hexammoniate results in the production of the novel active metal amide-alcoholate catalyst which in turn catalyzes the excess epoxide (that quantity over one mol) to polymer.

In the polymerization of ethylene oxide with catalysts prepared according to Equation IV supra the following results were generally observed. Catalysts prepared by the reaction of less than about 0.2 mol of ethylene oxide with 1.0 mol of metal hexammoniate effectively polymerized ethylene oxide to polymers which had reduced viscosity values of about 30, and higher. Similar approximate reduced viscosity values were obtained from polymers prepared by polymerizing ethylene oxide with the corresponding metal amide alone. Catalysts prepared by the reaction of from about 0.35 to about 0.6 mol of ethylene oxide with 1.0 mol of metal hexammoniate polymerized ethylene oxide to polymers which, in general, had a reduced viscosity value in the range of from about 20 to 25. The reduced viscosity value of the polymer product was further lowered by employing catalysts prepared by the reaction of more than 0.6 mol of ethylene oxide with 1.0 mol of ethylene oxide. However, it is again reiterated that the novel catalysts of this invention which were prepared by reacting up to 1.0 mol of epoxide with metal hexammoniate were catalytically more active than the corresponding essentially pure metal amides.

The choice of the epoxide reagent employed in Equation IV illustrated previously produces, in general, catalysts which exhibit desirable characteristics and properties. For instance, the use of ethylene oxide provides catalysts which give rapid polymerization rates (as compared to the corresponding metal amide under comparative operative conditions). Diisobutylene oxide is also desirable from a standpoint of producing catalysts which exhibit rapid polymerization rates, and in addition, the relatively large alcoholate radical of the resulting metal amide-alcoholate catalyst tends to solubilize said catalyst in inert diluents, e.g., heptane, cyclohexane, and the like, which can be employed during the polymerization process. The use of propylene oxide during the catalyst preparation results in a catalyst which exhibits a lower polymerization rate and the resulting polymeric product generally has a lower reduced viscosity value. In general, catalysts prepared by using epoxides other than ethylene oxide tend to produce polymers which have a lower molecular weight as compared to polymers produced by employing the corresponding metal amide catalysts or the ethylene oxide-modified catalysts of Equation IV supra. For various fields of uses and applications a relatively lower molecular weight polymer is highly desirable than the corresponding relatively high molecular weight polymer, e.g., in the warp sizing, thickening, and lubricating fields. The preparation of the catalysts illustrated by Equation IV supra represent the preferred catalysts of this invention.

In another embodiment the divalent metal amide-alcoholate catalysts of this invention can be prepared by the reaction of a monohydroxy organic compound with metal amide or metal hexammoniate as illustrated by Equations V and VI below, (V) $Ca(NH_3)_6 + HOC(CH_3)_3 \rightarrow$
$H_2N-Ca-OC(CH_3)_3 + H_2 + 5NH_3$ (VI) $Ca(NH_2)_2 + HOC(CH_3)_3 \rightarrow$
$H_2N-Ca-OC(CH_3)_3 + NH_3$ Equation V is applicable to alkaline earth metal hexammoniates preferably dissolved in liquid ammonia whereas in Equation VI the reagent can be a divalent metal amide wherein the metal portion has an atomic number greater than 4 and less than 57 from group II of the periodic table. The reactions illustrated by Equations V and VI can be conducted at a temperature in the range of from about $-70°$ C., and lower, to about $+60°$ C., and higher. Of course, when an inert, normally-liquid vehicle is employed, the lower temperature limit is above the melting point of said vehicle. In general, the monohydroxy compound can be a saturated aliphatic alcohol, a saturated cycloaliphatic alcohol, or a phenol (including fused aromatic nuclei containing a hydroxyl radical). The hydroxyl group can be attached to a primary, secondary, tertiary, or aromatic carbon atom. The saturated aliphatic hydrocarbon alcohols are preferred. Illustrative monohydroxy organic compound include, for example, alkanols, e.g., methanol, ethanol, n-propanol, isopropanol, butanol, t-butanol, hexanol, 2-ethylhexanol, octanol, decanol, dodecanol, and the like; cycloalkanols, e.g., cyclopentanol, cyclohexanol, cycloheptanol, 2-methylcyclohexanol, and the like; phenols, e.g., phenol, xylenol, naphthol, and the like. Tertiary butanol is highly preferred since the resulting catalyst produces polymer of lower molecular weight at faster polymerization rates than the corresponding metal amide.

The products resulting from the reaction depicted by Equation VI supra are effective polymerization catalysts giving, in general, polymer products, e.g., poly(ethylene oxide), which have relatively lower reduced viscosity values (approximately 5 to 15) at rapid polymerization rates than, e.g., the corresponding metal amides. Moreover, these catalysts (Equations V and VI) are effective at polymerization temperatures, e.g., 20° C. and lower, which temperatures would render the alkaline earth metal alcoholates virtually inoperative as catalysts for the polymerization, for example, of olefin oxides. It is readily apparent that catalysts which produce polymers, particularly poly(ethylene oxide), having a reduced viscosity value in the range of from about 5 to 15 are highly desirable especially where the uses or applications of said polymers require a high concentration of solids in solution without producing a solution so viscous as to be difficult to handle or process.

With reference to Equations V and VI the reaction of the monohydroxy compound with metal hexammoniate is readily carried out in a liquid ammonia medium preferably under rapid agitation. The reaction of the monohydroxy compound with metal amide can also be carried out in liquid ammonia after the evolution of hydrogen associated with the conversion of metal hexammoniate to metal amide has ceased. Again, rapid agitation is desirable. It is to be mentioned, however, that when a relatively higher boiling alcohol, e.g., 2-ethylhexanol, is employed the reaction mixture may pass through a viscous, frothy stage which can be difficult to handle. Alternatively, the reaction can be carried out by suspending the metal amide reagent in an inert, normally-liquid organic vehicle, e.g., heptane, cyclohexane, and the like, and then adding the monohydroxy compound to the resulting slurry or suspension, preferably under agitation. When such a preparative method is employed, the resulting slurry or suspension can be used directly as the catalyst source for effecting the polymerization reaction. The reactions illustrated by Equations V and VI produce active catalysts of optimum activity when from about 0.2 mol, and lower, to about 0.7 mol, and higher, of hydroxy compound per mol of metal hexammoniate or metal amide are employed.

In another embodiment of this invention the metal amide-alcoholate catalysts can be prepared by the reaction of a saturated aliphatic aldehyde with alkaline earth metal hexammoniate, preferably in a liquid ammonia medium, according to the following equation:

(VII) 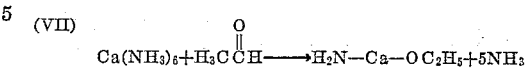

The reaction can be conducted at a temperature in the range of from about $-70°$ C., and lower, to about $+60°$ C., and higher. When employing an inert, normally-liquid vehicle, the lower temperature limit is above the melting point of said vehicle. Active catalysts of optimum activity are produced when from about 0.2 mol, and lower, to about 0.7 mol, and higher, of aldehyde per mol of metal hexammoniate are employed.

Illustrative saturated aliphatic hydrocarbon aldehydes which can be employed in exemplary Equation VII above include, among others, formaldehyde, acetaldehyde, propionaldehyde, n-butyraldehyde, isobutyraldehyde, n-valeraldehyde, isovaleraldehyde, decanal, and the like. Acetaldehyde is preferred.

With reference to Equations IV, V, VI, and VII, any excess liquid ammonia present in the reaction product is allowed to weather or evaporate from same as taught, for instance, in the operative examples.

The catalysts prepared in accordance with Equations IV, V, VI, and VII are, indeed, novel and highly catalytically active compositions of matter. When a mixture of metal alcoholate, RO—M—OR, and metal amide, $H_2N-M-NH_2$ (M can be, for example, calcium, barium, or strontium), is prepared and tested as a catalyst for the polymerization of olefin oxide at a temperature, for example, of from 30° to 40° C., the polymerization rate is substantially identical to that found when a quantity of essentially pure metal amide, equal in weight to the amount of metal amide contained in the abovesaid mixture, is used as the catalyst. This shows that rather than giving results comparable to those achieved with metal amide-alcoholates (which, incidentally, give polymerization rates as much as 10 to 20 times faster than the rates achieved with essentially pure metal amides), the added or contained metal alcoholate in the above-said mixture merely functions as an inert diluent. This observation is not surprising inasmuch as the metal alcoholates are virtually inactive as polymerization catalysts at such temperatures. These results shown that the highly improved catalytic activity of the metal amide-alcoholates does not arise from any possible synergistic effect which could be found in a combination or mixture of metal alcoholate and metal amide.

When the metal amide-alcoholates are subjected to hydrolysis the products are, as expected, ammonia and alcohol. It might be noted that the alcohol produced by hydrolysis of metal amide-propylate (prepared via Equation IV using propylene oxide as the epoxide) is isopropanol. Moreover, infra-red analysis of the metal amide-alcoholates disclose the presence of metal to oxygen bonds. In addition, mass spectrometer analysis of the hydrolyzed product of metal amide-ethylate (prepared via Equation IV using ethylene oxide as the epoxide) discloses the presence of ethanol ion. These data disclose that the products resulting from Equations IV, V, VI, and VII supra contain amide groups and alcoholate groups. Furthermore, their chemical behavior as catalysts for polymerization, for example, of olefin oxides, can not be reproduced by physically mixing a metal amide with a metal alcoholate. Thus, it is apparent that a new chemical species with different chemical properties has been produced, and this specification has termed them metal amide-alcoholates as defined in Equation I supra.

Though the metal amide-alcoholates are not pyrophoric their catalytic activity is readily destroyed upon exposure to air. It is oftentimes desirable and convenient to form a suspension or slurry of metal amide-alcoholate in an inert, normally-liquid organic vehicle such as a saturated hydrocarbon, e.g., heptane, cyclohexane, and the like; organic ether, e.g., dioxane, lower dialkyl ethers of alkylene glycol, etc. In this manner, the metal amide-alcoholate is protected from exposure to the atmosphere, and the slurry or suspension also provides a convenient method of transportation, storage, and measurement.

The alkaline earth metal hexammoniates, i.e., $M(NH_3)_6$ wherein M is calcium, barium, or strontium, constitute the second class of catalysts which have been found to be effective in polymerizing epoxide compounds.

As indicated earlier, one aspect of the instant invention is directed to the process for polymerizing epoxide compounds, particularly olefin oxides, in contact with a catalytically significant quantity of metal amide-alcoholate or metal hexammoniate or mixture of metal amide and metal amide-alcoholate catalysts to produce useful polymers. A single epoxide compound or an admixture of at least two different epoxide compounds can be employed as the monomeric feed. In a broad aspect the epoxide compounds contemplated as starting material in the instant polymerization process contain a cyclic group composed of two carbon atoms and one oxygen atom. This cyclic group can be an internal group or a terminal group in the epoxide molecule. These epoxide compounds are further characterized by being free of ethylenic and acetylenic unsaturation.

It is to be understood that the term "olefin oxide," as used herein including the appended claims, is meant an organic compound which contains oxirane oxygen bonded to vicinal or adjacent carbon atoms to form the following epoxy group i.e.,

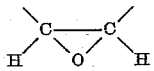

wherein each unsatisfied epoxy carbon valence of said group is satisfied by hydrogen, haloaryl, or a hydrocarbon radical free from ethylenic and acetylenic unsaturation; e.g., alkyl, cycloalkyl, aryl, aralkyl, or alkaryl. In addition, both unsatisfied epoxy carbon valences can be satisfied by alkylene radicals which together with the epoxy carbon atoms form a saturated cyclo-aliphatic hydrocarbon nucleus which contains from 4 to 10 carbon atoms inclusive. It is to be understood, also, that the term "lower olefin oxides" encompasses monomers such as ethylene oxide, propylene oxide, 1,2-epoxybutane, 2,3-epoxybutane, and the like.

As indicated previously the monomeric olefin oxide employed in the polymerization process of this invention can be characterized by the following formula:

(VIII) 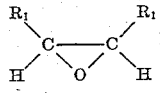

wherein each $R_1$, individually, can be hydrogen, haloaryl, or a hydrocarbon radical free from ethylenic and acetylenic unsaturation such as, for example, alkyl, aryl, cycloalkyl, aralkyl, or alkaryl radicals. In addition, both $R_1$ variables can be alkylene radicals which together with the epoxy carbon atoms, i.e., the carbon atoms of the epoxy group,

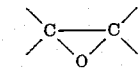

form a saturated cycloaliphatic hydrocarbon nucleus containing from 4 to 10 carbon atoms, preferably from 4 to 8 carbon atoms, for example, cycloalkyl, alkyl-substituted cycloalkyl, cyclobutyl, cyclopentyl, cyclohexyl, cycloheptyl, cyclooctyl, 2-methylcyclopentyl, 3-amylcyclohexyl, and the like. Illustrative $R_1$ radicals include, among others, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclohexyl, 2-methylcyclohexyl, cycloheptyl, and the like. It is preferred that a lower olefin oxide be employed as starting material in the homopolymerization reaction. In polymerizing an admixture comprising two different olefin oxides, it is also preferred that one of the olefin oxides be a lower olefin oxide.

Representative olefin oxide monomers which can be employed in the polymerization process include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2-epoxyoctadecane, 5-benzyl-2,3-epoxyheptane, 4-cyclohexyl-2,3-epoxypentane, chlorostyrene oxide, styrene oxide, ortho-, meta-, and para-ethylstyrene oxide, glycidyl benzene, the oxabicycloalkanes and alkyl-substituted oxabicycloalkanes, e.g., 7-oxabicyclo[4.1.0]heptane, 6-oxabicyclo[3.1.0]hexane, 4-propyl-7-oxabicyclo[4.1.0]heptane, 3-amyl-6-oxabicyclo[3.1.0]hexane, and the like.

The catalyst is employed in catalytically significant quantities. In general, a catalyst concentration in the range of from about 0.02, and lower, to about 10, and higher, weight percent, based on the weight of total monomeric feed, is suitable. A catalyst concentration in the range of from about 0.1 to about 3 weight percent, based on the weight of total monomeric feed, is preferred. For optimum results, the particular catalyst employed, its preparation, its surface area, the nature of the monomeric reagent(s), the temperature at which the polymerization reaction is conducted, and other factors will largely determine the desired catalyst concentration.

The polymerization reaction can be conducted over a wide temperature range. Depending on various factors such as the nature of the olefin oxide reagent(s) employed, the particular catalyst employed, the concentration of the catalyst, and the like, the reaction temperature can be as low as $-30°$ C. and as high as $+150°$ C. A suitable temperature range is from about $0°$ C. to about $150°$ C. For the preparation of granular poly(ethylene oxide) (which preparation is a highly preferred embodiment and is described hereinafter in detail) a reaction temperature below about $70°$ C. is suitable. Though granular poly(ethylene oxide) can be prepared at a reaction temperature of about $65°-70°$ C., the poly(ethylene oxide) product tends to accumulate on the interior surfaces of the reaction equipment. Consequently, it is preferred that the reaction temperature for the preparation of granular poly(ethylene oxide) be in the range of from about $-30°$ to $65°$ C., and more preferably still from about $0°$ to $60°$ C. In an extremely desirable aspect the polymerization reaction is conducted below about the softening point of the resulting granular poly(ethylene oxide) product.

In general, the reaction time will vary depending on the operative temperature, the nature of the olefin oxide reagent(s) employed, the particular catalyst and the concentration employed, the surface area of the catalyst employed, the use of an inert diluent, and other factors. The reaction time can be as short as minutes in duration or it can be as long as several days.

When polymerizing an admixture containing two different olefin oxides, the proportions of said olefin oxides can vary over the entire range. Preferably the concentration of either monomeric olefin oxide is in the range of from about 5 to about 95 weight percent, based on the total weight of said olefin oxides.

The polymerization reaction preferably takes place in the liquid phase. Preferably, the polymerization reaction is conducted under an inert atmosphere, e.g., nitrogen. It is also highly desirable to effect the polymerization process under substantially anhydrous conditions. Impurities such as water, aldehyde, carbon dioxide, and oxygen which may be present in the olefin oxide feed and/or reaction equipment should be avoided.

The polymers of this invention can be prepared via the bulk polymerization, suspension polymerization, or the solution polymerization route. The polymerization reaction can be carried out in the presence of an inert organic diluent such as, for example, aromatic hydrocarbons, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol and the like; normally-liquid saturated hydrocarbons including the open chain, cyclic, and alkyl-substituted cyclic saturated hydrocarbons such as hexane, heptane, various normally-liquid petroleum hydrocarbon fractions, cyclohexane, the alkylcyclohexanes, decahydronaphthalene, and the like.

Unreacted monomeric reagent oftentimes can be recovered from the reaction product by conventional techniques such as by heating said reaction product under reduced pressure. The polymer product also can be recovered from the reaction product by washing said reaction product with an inert, normally-liquid organic diluent, and subsequently drying same under reduced pressure at slightly elevated temperatures. Another route involves dissolution in a first inert organic solvent, followed by the addition of a second inert organic solvent which is miscible with the first solvent but which is a non-solvent for the polymer product, thus precipitating the polymer product. Recovery of the precipitated polymer can be effected by filtration, decantation, etc., followed by drying same as indicated previously. Granular poly(ethylene oxide) can be recovered from the reaction product by filtration, decantation, etc., followed by drying said granular poly(ethylene oxide) under reduced pressure at slightly elevated temperatures, e.g., about 30°–40° C. If desired, the granular poly(ethylene oxide), prior to the drying step, can be washed with an inert, normally-liquid organic diluent, in which the granular polymer is insoluble, e.g., heptane, cyclohexane, and the like, and then dried as illustrated above.

As indicated previously a highly preferred embodiment of the instant invention is directed to the preparation of granular poly(ethylene oxide) via the suspension polymerization process. The term "suspension polymerization process," as used herein including the appended claims, refers to polymerization in the presence of an inert, normally-liquid organic diluent in which the monomer employed is soluble and the polymer produced is insoluble. Granular poly(ethylene oxide) results from the suspension polymerization of an agitated reaction mixture comprising ethylene oxide in contact with a catalytic amount of a catalyst previously described, i.e., the metal amide-alcoholates, the metal hexammoniates, or mixtures of metal amide and metal amide-alcoholate, the suspension polymerization reaction being conducted at a temperature below about the softening point of the resulting granular poly(ethylene oxide) product. A suitable temperature range is from about −30° to +65° C., and preferably from about 0° to 60° C. Agitation of the reaction mixture is necessary in order to maintain catalyst suspended in said reaction mixture during the course of the polymerization reaction.

Unlike the granular poly(ethylene oxide) which directly results from the suspension polymerization route as illustrated above, the bulk or solution polymerization of ethylene oxide yields non-granular, resinous poly(ethylene oxide) which is substantially an entire polymeric mass or an agglomerated polymeric mass or it is dissolved in the inert, organic diluent. It is understood, of course, that the term "bulk polymerization" refers to polymerization in the absence of an inert, normally-liquid organic diluent, and the term "solution polymerization" refers to polymerization in the presence of an inert, normally-liquid organic diluent in which the monomer employed and the polymer produced are soluble.

That granular poly(ethylene oxide) should directly result by effecting the instant invention via the suspension polymerization route was, indeed, highly surprising and unexpected. Granular poly(ethylene oxide) possesses several highly desirable characteristics. One can recover granular poly(ethylene oxide) from the reaction product by the mere technique of decantation or filtration, followed by drying at slightly elevated temperatures, e.g., 30°–40° C. Further treatment is unnecessary and the granular polymer can be shipped to customers in bags or drums. Poly(ethylene oxide) prepared via the solution polymerization route necessitates the complete removal of the inert organic vehicle at elevated temperatures in order to recover the polymer dissolved in said vehicle. The resulting polymer, of course, is not granular. Mechanical means, e.g., Marshall mill, extruding equipment, hammer mill, and the like, are necessary to reduce non-granular, resinous ethylene oxide polymers prepared by the bulk or solution polymerization routes to a particle size which approximately corresponds to the granular poly(ethylene oxide). As is apparent, such mechanical expedients are expensive and time-consuming. Moreover, resinous poly(ethylene oxide) tends to undergo molecular degradation when subjected to a shearing force such as would be produced by the mechanical means illustrated previously.

Many of the fields of applications for ethylene oxide polymers which have a reduced viscosity in acetonitrile above about 1.0 entail solution, oftentimes in water, as an essential step. As is well-known a smaller particle size hastens solution. Thus, it is readily apparent that the solution of granular poly(ethylene oxide) in liquid media by virtue of its small particle size is enhanced. Furthermore, though solution of non-granular, resinous poly(ethylene oxide) prepared via the bulk or solution polymerization routes can be hastened by expedients, for example, high speed stirring, the employment of such techniques results in severe molecular degradation of the relatively high molecular weight polymers.

As previously explained, granular poly(ethylene oxide) which has a reduced viscosity value in acetonitrile of at least 1.0 can be produced via the suspension polymerization route by employing an inert, normally-liquid organic diluent in which the ethylene oxide monomer is soluble and the resulting polymer is insoluble. It is understood, of course, that the diluent employed is non-reactive with ethylene oxide. Illustrative diluents suitable in the suspension polymerization process are the normally-liquid saturated hydrocarbons, e.g., saturated aliphatic hydrocarbons, saturated cycloaliphatic and alkyl-substituted cycloaliphatic hydrocarbons; various normally-liquid saturated ethers; and the like. Examples of preferred diluents include, among others, hexane, heptane, isoheptane, ethylpentane, the octanes, the decanes, various petroleum hydrocarbon fractions, cyclohexane, alkyl-substituted cyclohexanes, decahydronaphthalene, and the like. Other illustrative diluents which can be employed include, diethyl, dipropyl, dibutyl, and higher dialkyl ethers; dioxane; the lower glycol dialkyl ethers of diethylene glycol; and the like. It is to be noted that certain of these ether diluents become solvents for the polymer at elevated temperatures. Among such ethers are dioxane, the dimethyl and diethyl ethers of ethylene glycol and of diethylene glycol.

The polymerization process can be carried out in a sealed reaction vessel under the autogenous pressure of the reaction mixture. It is preferred to employ from about 3 to about 400 parts by weight of ethylene oxide per 100 parts by weight of diluent; however, lower or higher proportions of ethylene oxide can also be employed.

A preferred method for producing granular poly(ethylene oxide) is to feed the ethylene oxide into the stirred diluent which contains one of the polymerization catalysts previously described, the reaction temperature being maintained below about the softening point of the resuling granular polymer product, e.g., below about 65°–70° C. When operating in this manner pressure equipment is not necessary. The ethylene oxide is fed into the stirred diluent and unreacted ethylene oxide, if any, is allowed to pass out of the reaction vessel, for example, through a vent, an appropriately adjusted blow-off valve, or other means, as desired. When the process is conducted, for example, under atmospheric pressure at a temperature of about 40° C., the solubility of ethylene oxide in heptane is about 10 parts by weight of ethylene oxide per 100 parts by weight of heptane. The reaction proceeds readily under conditions of pressure and temperature when the concentration of ethylene oxide is about 3 parts by weight of ethylene oxide per 100 parts by weight of diluent. It is highly desirable to conduct the suspension polymerization reaction under a blanket of nitrogen gas, care being taken to exclude oxygen and carbon dioxide. The suspension polymerization can be conducted as a batch, semi-continuous, or a continuous process.

The solid homopolymers prepared in accordance with the teachings of this invention are a useful class of compounds. The ethylene oxide polymers are hard, firm, tough and resinous in character, and they have a reduced viscosity value of from about 1.0 to 75, and higher, in acetonitrile. The ethylene oxide polymers appear to form homogeneous systems with water in all proportions. Although the higher molecular weight poly(ethylene oxide) merely swell on the addition of small amounts of water, on the addition of greater amounts of water these polymers pass into solution. The water solutions are viscous, the viscosity increasing both with the concentration of the polymer and the molecular weight of the polymer. The ethylene oxide polymers show little change in melting point with increased molecular weight and the melting point, as measured by change in stiffness with temperature, is found to be about 65±2° C. throughout the range of reduced viscosity values of from 1 to 75, and greater (in acetonitrile). The crystallization temperature, as determined by measuring the break in the cooling curve, is about 55° C. The ethylene oxide polymers are soluble in water, acetonitrile, chloroform, methanol, and mixtures of water and higher saturated aliphatic alcohols. The ethylene oxide polymers are insoluble in glycerol and normally-liquid saturated aliphatic hydrocarbons.

The practice of the instant invention also lends itself to the production of solid homopolymers of other olefin oxides such as, for example, poly(propylene oxide), poly(butylene oxide), poly(dodecylene oxide), poly(styrene oxide), and the like.

The copolymers of this invention can be water-soluble or water-insoluble solid compositions depending upon the ratio of the chemically combined monomeric content therein. In general, those copolymers containing a minor proportion, i.e., less than about 50 weight percent, of ethylene oxide copolymerized therein are solid water-insoluble compositions. However, it is generally observed that copolymers containing greater than 50 weight percent of ethylene oxide chemically combined in said copolymers, tend to be water-soluble, and this water-soluble characteristic increases as the ethylene oxide content of the resulting copolymer increases. Thus, the instant invention is admirably suited for the preparation of "tailor-made" solid copolymers that have characteristics and properties built into said copolymers which cover a spectrum of properties that are highly desirable in various fields of applications and uses.

The polymers of this invention have a variety of uses. The resinous polymers are useful for the production of various shaped articles, e.g., buttons, brush handles, lamp bases, etc. Resinous ethylene oxide polymers are useful as coagulants and water-soluble lubricants. The water-soluble and water-insoluble solid polymers are also useful in the preparation of films by conventional techniques such as by milling on a two-roll mill, calendering, solvent casting, and the like. The homopolymers of the lower olefin oxides and the copolymers containing a lower olefin oxide as a comonomer are preferred polymeric classes. Those copolymers containing ethylene oxide, and in particular greater than 50 weight percent ethylene oxide, are especially preferred polymeric classes.

In the illustrative examples to follow, the catalyst preparation and the polymerization reaction were conducted in the absence of carbon dioxide, water, and oxygen. Exposure to the atmosphere was avoided during the catalyst process or polymerization process by carrying out said processes under a nitrogen atmosphere, or an ammonia atmosphere, or an ethylene oxide atmosphere.

*Example 1*

Liquid ammonia (2 liters) was added to a 3-liter glass resin flask (maintained in a Dry Ice-acetone bath, the temperature of which was below the boiling point of liquid ammonia) while avoiding exposure to the atmosphere. Ethylene oxide (10 grams) was then dissolved in the stirred liquid ammonia. Subsequently, calcium metal nodules (100 grams) was added to the ethylene oxide-ammonia solution over a 15-minute period while stirring was continued. The flask was allowed to stand overnight exposed to room temperature conditions (approximately 20°–22° C.) while the ammonia weathered off. The solid product was transferred at room temperature, in a nitrogen filled "dry box," to a one-gallon stainless steel container half filled with glass marbles. Two liters of heptane were added to said container which was then agitated in a reciprocating paint shaker for one hour thus producing a catalyst slurry or suspension in heptane. This slurry was further diluted with heptane and used as the catalyst source in polymerization reactions as indicated in subsequent examples.

*Example 2*

To a 2-liter glass resin flask equipped with a stirrer, thermometer, inlet conduit in the lower portion of the flask, and an outlet conduit connected to an exhaust system, there were charged one liter of heptane and a quantity of the catalyst suspension prepared as set forth in Example 1 supra, said catalyst suspension containing 0.83 gram of calcium calculated as the metal. Gaseous ethylene oxide was introduced into the resin flask via the inlet conduit and bubbled through the resulting mixture during the course of the polymerization reaction. Excess ethylene oxide was removed via the outlet conduit. In this manner, the reaction medium was continuously saturated with ethylene oxide. The polymerization reaction was maintained at 25° to 31° C. for a period of 7 hours. The resulting finely-divided polymer was recovered from the reaction product by filtration, followed by overnight drying of same at room temperature. There was obtained white, granular poly(ethylene oxide).

*Example 3*

The catalyst employed in this example was prepared in the same manner as set forth in Example 1 except that 60 cc. of liquid ethylene oxide was used in lieu of 10 grams of liquid ethylene oxide.

To the equipment described in Example 2, there were charged 1,000 cc. of heptane and a quantity of the catalyst suspension prepared as described in the preceding paragraph, said catalyst suspension containing 1.0 gram of calcium calculated as the metal. Ethylene oxide was bubbled through the resulting mixture in the same manner as explained in Example 2. The polymerization reaction was maintained at 25° to 38° C. for a period of 7 hours. The resulting finely-divided polymer was recovered from the reaction product by filtration, followed by drying same at room temperature under reduced pressure, i.e., approximately 1 mm. of Hg. There were obtained 86 grams of white, granular poly(ethylene oxide) which had a reduced viscosity value in acetonitrile of 27.4.

*Example 4*

To the equipment described in Example 2, there were charged 1,000 cc. of heptane, 100 grams of liquid ethylene oxide, and a quantity of calcium amide, $Ca(NH_2)_2$, which contained 1.0 gram of calcium calculated as the metal. Ethylene oxide was bubbled through the resulting mixture in the same manner as explained in Example 2. The polymerization reaction was maintained at 18° to 31° C. for a period of 7 hours. The resulting finely-divided polymer was recovered from the reaction product by filtration, followed by drying same at room temperature under the reduced pressure. There were obtained 32 grams of granular poly(ethylene oxide) which had a reduced viscosity value in acetonitrile of 48.0.

*Example 5*

To the equipment described in Example 2, there were charged 1,000 cc. of heptane, 100 grams of liquid ethylene oxide, and a quantity of calcium ethylate, $Ca(OC_2H_5)_2$, which contained 1.0 gram of calcium calculated as the metal. Ethylene oxide was bubbled through the resulting mixture in the same manner as explained in Example 2. No polymerization (or polymer) was manifest after 5.75 hours at a temperature of 19° to 26° C.

*Example 6*

To the equipment described in Example 2, there were charged 1,000 cc. of heptane, 100 grams of liquid ethylene oxide, and a mixture of calcium ethylate (contained 0.5 gram of calcium calculated as the metal) and calcium amide (also contained 0.5 gram of calcium calculated as the metal). Ethylene oxide was bubbled through the resulting mixture in the same manner as explained in Example 2. The polymerization reaction was maintained at 18° to 29° C. for a period of 7 hours. The resulting finely-divided polymer was recovered from the reaction product by filtration, followed by drying same at room temperature under reduced pressure. There were obtained 17 grams of white, granular poly(ethylene oxide) which had a reduced viscosity value in acetonitrile of 10.0.

It will be noted that Examples 3 through 6 were conducted under comparative conditions with the exception of the catalyst and/or the catalyst concentration. In Example 5, calcium ethylate, $Ca(OC_2H_5)_2$, was ineffective as a polymerization catalyst at the indicated temperature range. In Example 4, the concentration of calcium amide, $Ca(NH_2)_2$, was doubled the concentration of calcium amide employed in Example 6, based on calcium metal analysis. It is interesting to note that the quantity of polymer (32 grams) produced in Example 4 was approximately double the quantity of polymer (17 grams) produced in Example 6. The calcium ethylate contained in the catalyst admixture of Example 6 can be considered to be an added inactive ingredient under the polymerization conditions employed. Such conclusion is further strengthened by noting that calcium ethylate failed to effect polmerization in Example 5. However, the catalyst suspension containing calcium amide-ethylate, $H_2N-Ca-OC_2H_5$ (containing 1.0 gram of calcium) employed in Example 3 gave 86 grams of polymer. This yield stands in sharp contrast to the 32 grams of polymer obtained in Example 4 using calcium amide (containing 1.0 gram of calcium) as the catalyst.

*Example 7*

A. To a 500 cc. Parr bomb maintained in Dry Ice-acetone bath, there were charged 5 grams of calcium metal, 2.6 grams of liquid ethylene oxide, and 87 grams of liquid ammonia. The Parr bomb was then removed from the Dry Ice-acetone bath and placed in an ice-water bath. After 2 hours at approximately 0° C., a steady pressure of 100 p.s.i.g. was noted. Of this pressure about 47 p.s.i.g. was due to ammonia and about 53 p.s.i.g. was due to hydrogen. After the steady pressure noted above was obtained, the bomb was vented and the product slurried in heptane.

B. The same procedure outlined in part A above was followed except that no ethylene oxide was added to the Parr bomb. After a period of time a steady pressure of 160 p.s.i.g. was obtained. Of this pressure the amount due to hydrogen was approximately twice the pressure of the hydrogen released in part A above.

To the equipment described in Example 2, there were charged 1,000 cc. of heptane and a quantity of the catalyst slurry prepared as described in part A above, said catalyst slurry containing 1.0 gram of calcium calculated as the metal. Ethylene oxide was bubbled through the resulting mixture in the same manner as explained in Example 2. The polymerization reaction was maintained at 25° to 38° C. for a period of 7 hours. The resulting finely-divided polymer was recovered from the reaction product by filtration, followed by drying same at room temperature under reduced pressure. There were obtained 114 grams of white, granular poly(ethylene oxide) which had a reduced viscosity value in acetonitrile of 55.8.

*Example 8*

Calcium metal (10 grams) and 150 milliliters of diethyl ether of diethylene glycol were charged to a 500 milliliter, 3-necked flask equipped with stirrer, blow-off vent, and gas-delivery tube. The flask was immersed in an ice bath and the temperature of the resulting reaction was maintained at 0° to 5° C. The mixture was stirred vigorously and ammonia was bubbled into the flask for about 5.25 hours during which period of time a finely-divided gold suspension was formed. Subsequently, 5 grams of propylene oxide was slowly added to the resulting suspension over a period of about 5 to 10 minutes. During the addition of the propylene oxide, the suspension charged from gold in color to grayish blue. On titration, the calcium contained of the suspension was found to be 0.125 gram of calcium per 5 milliliters of suspension.

In an analogous manner as above, when 4.5 grams of strontium metal are substituted for the 10 grams of calcium metal and the preceding procedure is repeated, there is obtained an active catalyst suspension which effectively polymerizes olefin oxides under operative conditions similar to those set forth in the next paragraph.

To the equipment described in Example 2, there were charged 30 milliliters of the catalyst suspension prepared as set forth in the first paragraph of Example 8 and 650 grams of heptane. The resulting suspension was stirred very rapidly while ethylene oxide was bubbled through same in the manner explained in Example 2. During the addition of the ethylene oxide the temperature of the reaction mixture rose to 42° in 25 minutes and then dropped, over a 5-hour period, to 30° C. The resulting finely-divided polymer was recovered from the reaction product by filtration, followed by drying same at room temperature under reduced pressure. There were obtained 38 grams of white, granular poly(ethylene oxide) which had a reduced viscosity in acetonitrile of 3.2.

*Example 9*

To a 500 milliliter bomb, there were charged 5 grams of calcium metal, 50 grams of liquid ammonia, and 3.5 grams of propylene oxide. The temperature of the bomb was maintained at 0° to 4° C. for 17 hours. Hydrogen and ammonia were vented off during the course of the reaction. After this period of time the contents in the bomb were slurried in heptane.

To the equipment described in Example 2, there were charged 650 cc. of heptane and a quantity of the above-described catalyst slurry which contained 2 grams of solid product. Ethylene oxide was bubbled through the resulting mixture in the same manner as explained in Example 2. The polymerization reaction was maintained at 26° to 35° C. for a period of 2.25 hours. The resulting finely-divided polymer was recovered from the reaction product by filtration, followed by drying same at room temperature under reduced pressure. There were obtained 58 grams of white, granular poly(ethylene oxide) which had a reduced viscosity value in acetonitrile of 3.1.

*Example 10*

The equipment and technique employed in the catalyst preparation of Example 7 were followed in this example. The 500 cc. Parr bomb was charged with 5 grams of calcium metal, 11.5 grams of cyclohexene oxide, and 84 grams liquid ammonia. After one hour at 0° C., a steady pressure of 50 p.s.i.g. was observed. The hydrogen and ammonia were vented off and the resulting product was suspended in 200 cc. of heptane.

To the equipment described in Example 2, there were charged 1,000 cc. of heptane and 30 cc. of the above-described suspension (which contained 0.7 gram of calcium calculated as the metal). Ethylene oxide was bubbled through the resulting mixture in the same manner as explained in Example 2. The polymerization reaction was maintained at 29° to 50° C. for a period of 7 hours. The resulting finely-divided polymer was recovered from the reaction product by filtration, followed by drying same at room temperature under reduced pressure. There were obtained 75 grams of white, granular poly(ethylene oxide) which had a reduced viscosity value in acetonitrile of 20.5.

In an analogous manner as set forth in the first paragraph of Example 10, when 1.0 gram of strontium metal is substituted for the 5 grams of calcium metal there is obtained an active catalyst suspension. This catalyst suspension effectively polymerizes olefin oxides, e.g., ethylene oxide, under the operative conditions noted above.

*Example 11*

The equipment and technique employed in the catalyst preparation of Example 7 were followed in this example. The 500 cc. Parr bomb was charged with 5 grams of calcium metal, 15.7 grams of diisobutylene oxide, and 93 grams of liquid ammonia. After one hour at 0° C. a steady pressure of 60 p.s.i.g. had developed. Thereafter the ammonia and hydrogen were vented off and the resulting product was suspended in 200 milliliters of heptane.

To the equipment described in Example 2, there were charged 1,000 cc. of heptane, 100 grams of liquid ethylene oxide, and 30 cc. of the above-described catalyst suspension (which contained 0.7 of calcium calculated as the metal). Ethylene oxide was bubbled through the resulting mixture in the same manner as explained in Example 2 while maintaining the reaction temperature at 22° to 53° C. for a period of 45 minutes. The resulting finely-divided polymer was recovered from the reaction product by filtration, followed by drying same at room temperature under reduced pressure. There were obtained 50 grams of granular poly(ethylene oxide) which had a reduced viscosity value in acetonitrile of 21.0.

In an analogous manner as above, when an equal weight of 4-vinylcyclohexene oxide is substituted for ethylene oxide there is obtained a solid homopolymer.

*Example 12*

The equipment and technique employed in the catalyst preparation of Example 7 were followed in this example. The Parr bomb was charged with 5 grams of calcium metal, 9 grams of styrene oxide, and 96 grams of anhydrous ammonia. After one hour at 0° C., a steady pressure of 50 p.s.i.g. had developed. The hydrogen and ammonia were vented off and the resulting product was slurried in 200 cc. of heptane.

To the equipment described in Example 2 there were charged 1,000 cc. of heptane, 100 grams of liquid ethylene oxide, and 20 cc. of the above-described catalyst slurry. Ethylene oxide was bubbled through the resulting mixture in the same manner as explained in Example 2 while maintaining the reaction temperature at 23° to 28° C. for a period of 7 hours. The resulting finely-divided polymer was recovered from the reaction product by filtration, followed by drying same at room temperature under reduced pressure. There were obtained 7 grams of granular poly(ethylene oxide) which had a reduced viscosity value in acetonitrile of 17.5.

*Example 13*

To a 3-necked flask equipped with stirrer, blow-off vent, and gas-delivery tube, there were charged 10 grams of calcium metal and 150 milliliters of diethyl ether of diethylene glycol. The flask was then immersed in an ice bath and the temperature of the resulting mixture was maintained at 0° to 5° C. The suspension of calcium in the diethyl ether diethylene glycol was vigorously stirred while ammonia was bubbled through same for a period of 6 hours thus forming a calcium hexammoniate suspension. To this suspension 17.55 grams of butylene oxide (an isomeric mixture of 1,2-epoxybutane and 2,3-epoxybutane boiling between 60° and 62° C.) were added very slowly over a period of about 10 minutes. During the addition of butylene oxide the temperature of the resulting admixture rose to 23° C.; there resulted a grayish-blue suspension.

To the equipment described in Example 2, there were charged 650 grams of heptane and 40.6 milliliters of the above-described catalyst suspension (which contained 1.0 gram calcium calculated as the metal). Ethylene oxide was bubbled through the resulting mixture in the same manner as explained in Example 2. The polymerization reaction was maintained at 25° to 39.5° C. for a period of 5 hours. The resulting finely-divided polymer was recovered from the reaction product by filtration, followed by drying same at room temperature under reduced pressure. There were obtained 20 grams of granular poly(ethylene oxide) which had a reduced viscosity value in acetonitrile of 4.0.

*Example 14*

To a 500-milliliter Paar bomb, there were charged 5 grams of calcium metal, 50 grams of liquid ammonia, and 3.5 grams of isobutylene oxide. To the resulting admixture there was added 0.1 gram of nickelous oxide to promote the reaction. The bomb was maintained at a temperature of about 0° to 4° C. for 17 hours. Hydrogen and ammonia were vented off during the course of the reaction.

At the end of this period of time the resulting product was slurried in heptane.

To the equipment described in Example 2, there were charged 650 grams of heptane and 23 cc. of the above-described catalyst slurry (containing one gram of calcium calculated as the metal). Ethylene oxide was bubbled through the resulting mixture in the same manner as explained in Example 2. The polymerization reaction was maintained at 26° to 39° C. for 4.5 hours. The resulting finely-divided polymer was recovered from the reaction product by filtration, followed by drying same at room temperature under reduced pressure. There were obtained 29 grams of white, granular poly(ethylene oxide) which had a reduced viscosity value in acetonitrile of 3.5.

*Example 15*

The catalyst was prepared in the same manner as set forth in Example 14 except that 4.5 grams of an isomeric mixture of butylene oxides were employed instead of 3.5 grams of isobutylene oxide. The isomeric mixture of butylene oxides was a fraction boiling between 60° and 62° C. and consisted primarily of 1,2-epoxybutane and about 10 weight percent of mixed isomers of 2,3-epoxybutane. The resulting catalyst product was slurried in 100 grams of heptane.

To the equipment described in Example 2, there were charged 650 grams of heptane and 33 milliliters of the above-described catalyst slurry (containing 1 gram of calcium calculated as the metal). Ethylene oxide was bubbled through the resulting mixture in the same manner as explained in Example 2. The polymerization reaction was maintained at 25° to 39° C. for a period of 3.5 hours. The resulting finely-divided polymer was recovered from the reaction product by filtration, followed by drying same at room temperature under reduced pressure. There were obtained 50 grams of white, granular poly(ethylene oxide) which had a reduced viscosity value in acetonitrile of 9.9.

*Example 16*

To a 2-liter flask equipped with magnetic stirrer, there were charged 700 milliliters of liquid ammonia and 8 grams methanol. Calcium metal (10 grams) was slowly added to the solution of methanol and ammonia while said solution was rapidly stirred. Stirring was continued until most of the ammonia had evaporated. The resulting mixture was allowed to stand overnight exposed to room temperature conditions, i.e., about 22° C., while the remaining ammonia evaporated therefrom. The solid product recovered weighed 21 grams.

To a glass tube, there were charged 30 grams of ethylene oxide and 0.03 gram of the above-prepared solid product. The tube was then sealed and heated to 90° C. and maintained at that temperature for 24 hours. Subsequently, the tube was broken open and the resulting polymeric product was recovered therefrom. A 4-gram yield of poly(ethylene oxide) was obtained; this polymer had a reduced viscosity value in acetonitrile of 4.2. Polymerization was also conducted in a second glass tube employing an equal amount of the same reactants. The polymerization reaction was maintained at room temperature, i.e., about 24° C., for a period of 40 hours. In this instance, a 3-gram yield of poly(ethylene oxide) was obtained which had a reduced viscosity value in acetonitrile of 14.7.

*Example 17*

To 30 cc. of a calcium amide suspension in heptane (containing 1.6 grams of calcium calculated as the metal), there were added 4.0 cc. of t-butyl alcohol (at room temperature). On the addition of said alcohol, a vigorous evolution of ammonia was observed.

To the equipment described in Example 2, there were charged the total amount of said catalyst suspension prepared as described above plus one liter of heptane. Ethylene oxide was bubbled through the resulting mixture in the same manner as explained in Example 2. The polymerization was maintained at 23° to 29° C. for a period of 6 hours. The resulting finely-divided polymer was recovered from the reaction by filtration, followed by drying same at room temperature under reduced pressure. There were obtained 16 grams of white, granular poly(ethylene oxide) which had a reduced viscosity value in acetonitrile of 1.1.

*Example 18*

To a 500 cc. Parr bomb, there were charged 5 grams of calcium metal, 9 grams of t-butanol and 100 cc. of liquid ammonia in the manner described in Example 7. The temperature of the ensuing reaction varied from −22° C. to +15° C. When no further pressure rise was noted, the bomb was vented to remove the gases produced in the reaction. The resulting solid product was then slurried in 100 cc. of heptane.

To the equipment described in Example 2, there were charged 1,000 cc. of heptane and a quantity of the catalyst slurry prepared as described in the preceding paragraph, said catalyst slurry containing 1.0 gram of calcium calculated as the metal. Ethylene oxide was bubbled through the resulting mixture in the same manner as explained in Example 2. The polymerization reaction was maintained at 25° to 33° C. for a period of 7 hours. The resulting finely-divided polymer was recovered from the reaction product by filtration, followed by drying same at room temperature under reduced pressure. There were obtained 39 grams of white, granular poly(ethylene oxide) which had a reduced viscosity value in acetonitrile of 1.5.

*Example 19*

To 30 cc. of a calcium amide suspension in heptane (containing 1.0 calcium calculated at the metal), there was added 0.6 gram of ethanol (at room temperature). Ammonia was given off during the reaction.

To the equipment described in Example 2, there were charged 1,000 cc. of heptane, 100 grams of liquid ethylene oxide, and a quantity of the catalyst suspension prepared as described in the preceding paragraph, said catalyst suspension containing 1.0 gram of calcium calculated as the metal. Ethylene oxide was bubbled through the resulting mixture in the same manner as explained in Example 2. Polymerization reaction was maintained at 23.5 to 28.5° C. for a period of 6.5 hours. The resulting finely-divided polymer was recovered from the reaction product by filtration, followed by drying same at room temperature under reduced pressure. There were obtained 20 grams of white, granular poly(ethylene oxide) which had a reduced viscosity value in acetonitrile of 7.2.

*Example 20*

To 30 cc. of a calcium amide suspension in heptane (containing 1 gram of calcium calculated as the metal), there was added 0.4 gram of methanol (at room temperature). Ammonia gas was given off during the reaction.

Subsequently, the above-prepared catalyst suspension together with 1,000 cc. of heptane and 100 grams of liquid ethylene oxide were charged to the equipment described in Example 2. Ethylene oxide was bubbled through the resulting mixture in the same manner as explained in Example 2 while the polymerization reaction was maintained at 23.5° C. to 28° C. for a period of 6.75 hours. The resulting finely-divided polymer was recovered from the reaction product by filtration, followed by drying same at room temperature under reduced pressure. There were obtained 15 grams of white, granular poly(ethylene oxide) which had a reduced viscosity value in acetontrile of 5.1.

*Example 21*

To 30 cc. of a calcium amide suspension in heptane (containing 1.0 gram of calcium calculated as the metal), there were added 1.5 grams of 2-ethylhexanol (at room temperature). Ammonia was given off during the reaction.

The above-prepared catalyst suspension together with 1,000 cc. of heptane and 100 grams of liquid ethylene oxide were charged to the equipment described in Example 2. Ethylene oxide was bubbled through the resulting mixture in the same manner as explained in Example 2 while the polymerization reaction was maintained at 23° to 27.5° C. for a period of 6.75 hours. The resulting finely-divided polymer was recovered from the reaction product by filtration, followed by drying same at room temperature under reduced pressure. There were obtained 8 grams of white, granular poly(ethylene oxide) which had a reduced viscosity value in acetonitrile of 4.6.

*Example 22*

The following catalyst suspension was prepared in the same manner set forth in Example 1 except 40 grams of calcium metal and 30 grams of allyl alcohol were employed instead of 100 grams of calcium metal and 10 grams of ethylene oxide.

To the equipment described in Example 2, there were charged 1,000 cc. of heptane, 100 grams of liquid ethylene oxide, and a quantity of the catalyst suspension prepared as described in the preceding paragraph, said catalyst suspension containing 1.0 gram of calcium calculated as the metal. Ethylene oxide was bubbled through the resulting mixture in the same manner as explained in Example 2 while the polymerization reaction was maintained at 23° to 27° C. for a period of 7 hours. The resulting finely-divided polymer was recovered from the reaction product by filtration, followed by drying same at room temperature under reduced pressure. There were obtained 120 grams of white, granular poly(ethylene oxid) which had a reduced viscosity value in acetonitrile of 38.2.

Example 23

To a 3-liter resin flask while avoiding exposure to the atmosphere, there were charged 1500 cc. of liquid ammonia and 40 grams of calcium metal. To the resulting solution there were then added 22 grams of acetaldehyde over a 20 minute period. The resin flask was allowed to stand overnight exposed to room temperature conditions while the ammonia evaporated therefrom. The resulting solid product was then slurried in heptane.

To the equipment described in Example 2, there were charged 1,000 cc. of heptane and 90 cc. of the above-prepared catalyst slurry (contained 1 gram of calcium calculated as the metal). Ethylene oxide was bubbled through the resulting mixture in the same manner as explained in Example 2 while the polymerization reaction was maintained at 17° to 30° C. for a period of 7 hours. The resulting finely-divided polymer was recovered from the reaction product by filtration, followed by drying same at room temperature under reduced pressure. There were obtained 43 grams of white, granular poly(ethylene oxide) which had a reduced viscosity value in acetonitrile of 48.

Example 24

To a 500 milliliter bomb, there were charged 5 grams of calcium metal and 50 grams of ammonia. Paraformaldehyde (4.5 grams) was heated to producing gaseous formaldehyde. The resulting gaseous formaldehyde was then introduced into the bomb which was maintained in a Dry Ice-acetone bath. After this, the bomb was allowed to warm up to about 4° to 5° C. and maintained at this temperature for 17 hours. Thereafter, the excess ammonia was allowed to evaporate off; the resulting solid product was then slurried in 100 grams of heptane at room temperature.

To the equipment described in Example 2, there were charged 650 grams of heptane and 49 milliliters of the above-prepared catalyst slurry (containing 1 gram of calcium calculated as the metal). Ethylene oxide was bubbled through the resulting mixture in the same manner as explained in Example 2 while maintaining the polymerization reaction at 25° to 34° C. for a period of 5 hours. The resulting finely-divided polymer was recovered from the reaction product by filtration, followed by drying same at room temperature under reduced pressure. There were obtained 18 grams of white, granular poly(ethylene oxide) which had a reduced viscosity value in acetonitrile of 12.6.

Example 25

Calcium metal nodules (4 lbs.) were placed in a metal cartridge contained in a 20-gallon stainless steel autoclave. Liquid ammonia (15 lbs.) was then introduced into the autoclave over the cartridge to dissolve the calcium metal. Thereafter, an additional 55 pounds of liquid ammonia together with 2.4 pounds of ethylene oxide were added to the autoclave. The temperature of the autoclave was maintained at 5° C.; the pressure in said autoclave was 90 p.s.i.g. After this, the excess ammonia was allowed to weather off, and the resulting solid product was slurried in heptane.

To a small glass tube, there were charged 30 grams of propylene oxide and 2.5 ml. of the above-prepared catalyst slurry (containing 0.1 gram of calcium calculated as the metal). The tube was sealed and then rotated end over end at room temperature, i.e., approximately 22° C., for 21 hours. At the end of this period of time the tube and contents were chilled in Dry-Ice, broken open, and the contents removed therefrom. There was obtained 1 gram of poly(propylene oxide) which had a reduced viscosity value in benzene of 10.8.

Example 26

To a glass tube, there were charged 30 grams of a butylene oxide fraction (an isomeric mixture of 1,2-epoxybutane and 2,3-epoxybutane) and 2.5 milliliters of the catalyst slurry prepared as set forth in Example 25 (contained 0.1 gram of calcium calculated as the metal). The tube was sealed and then rotated end over end at room temperature, i.e., about 22° C., for 4 days. There was obtained from the reaction product 1 gram of rubbery poly(butylene oxide).

Example 27

To a glass resin flask equipped with stirrer, there were charged 60 grams of propylene oxide and 1,000 cc. of heptane. To the resulting stirred mixture 51 milliliters of the catalyst slurry prepared as set forth in Example 25 was added, said catalyst slurry containing 2 grams of calcium calculated as the metal. The polymerization reaction was allowed to proceed at room temperature, i.e., about 22° C., for 6 hours. After this period of time a mass of polymer swollen with heptane was recovered from the reaction product by filtration and dried under vacuum. There were obtained 30 grams of a tough, rubbery polymer which had a reduced viscosity value in benzene of 14.4.

Example 28

To a glass resin flask, there were charged 1,000 cc. of heptane and 51 milliliters of the catalyst slurry prepared as set forth in Example 25, said catalyst slurry containing 2 grams of calcium calculated as the metal. Ethylene oxide was bubbled through a second glass flask which contained 50 grams of propylene oxide (at room temperature). The mixed vapors of ethylene oxide and propylene oxide which were removed from the second glass flask were introduced into the resin flask at a point beneath the surface of the stirred mixture contained in said resin flask. After 4 hours, the total amount of propylene oxide contained in the second glass flask had been introduced into the resin flask in this manner. Thereafter, the ethylene oxide feed was continued for an additional 1.25 hours. The polymerization reaction was maintained at a temperature in the range of from 24° to 41° C. for a period of 5 hours. The resulting copolymer product was recovered from the reaction mixture via filtration and dried at room temperature. There were obtained 128 grams of copolymer which was spongy and soft. The reduced viscosity value in benzene was 35.

The above polymerization procedure was repeated except the polymerization reaction was maintained at about 30° C. for a period of 3.5 hours. In this run 62 grams of white, granular copolymer product was obtained. The copolymer had reduced viscosity values of 13.85 and 32.8 in acetonitrile and benzene, respectively.

Example 29

To a three-necked three-liter flask equipped with stirrer, thermometer well, and inlet conduit, there were charged, at room temperature, 166 milliliters of 3 molar ethyl magnesium chloride in diethyl ether, 500 milliliters of anhydrous diethyl ether, and 60 milliliters of dioxane. Magnesium chloride which precipitated from the resulting stirred solution was removed via filtration. To the filtrate there were slowly added 6.2 grams of ethylene oxide, followed by bubbling ammonia through the solution over a period of about 5 hours. During this introduction of ammonia gas the solution was maintained at a temperature of about 10° to 15° C. After the excess ammonia had weathered off, the diethyl ether was removed via contrifugation and the resulting solid product, i.e., catalytically active material containing magnesium amide-butylate, was slurried in heptane. This slurry contained 0.017 gram of magnesium (calculated as the metal) per one milliliter of slurry.

When the above procedure was repeated using ethanol or butanol in lieu of ethylene oxide, the resulting slurry was catalytically active in polymerizing olefin oxides.

It should be noted that the novel divalent metal amide-alcoholates can also be prepared by the reaction of, for example, dialkylmagnesium, dialkylzinc, dialkylcadmium, and the like, with up to 1.0 mol of monohydroxy organic compound or olefin oxide (per mol of the dialkylmetal), followed by adding excess ammonia, preferably as a gas, to the resulting reaction product. Any excess or unreacted ammonia is allowed to weather or evaporate from the catalytically active reaction product. The reaction of the dialkylmetal with the monohydroxy organic compound or olefin oxide is preferably conducted in an inert, normally-liquid organic vehicle such as the lower dialkyl ethers of alkylene glycol, dioxane, saturated aliphatic and cycloaliphatic hydrocarbons, etc., illustrated previously. Exemplary olefin oxides and exemplary monohydroxy organic compounds which can be employed are illustrated in the discussion concerning Equations IV, V, and VI supra. Illustrative dialkylmetals include, for example, diethylmagnesium, dipropylmagnesium, diamylmagnesium, dibutylzinc, dioctylzinc, dioctadecylzinc, diethylcadmium, diisoamylcadmium, and the like. The reaction can be conducted at a temperature up to 50° C., and higher. When employing an inert, normally-liquid organic vehicle, the lower limit is, of course, above the freezing point of the vehicle. Active catalysts of optimum activity are produced when from about 0.2 mol, and lower, to about 0.7 mol, and higher, of monohydroxy organic compound or olefin oxide per mol of dialkylmetal are employed.

*Example 30*

To a resin flask equipped with stirrer, thermometer, inlet and outlet conduits, there were charged 650 grams of heptane and 59 milliliters of the catalyst slurry prepared as set forth in the first paragraph of Example 29, said catalyst slurry containing 1.0 gram of magnesium calculated as the metal. Ethylene oxide was bubbled through the resulting mixture in the same manner as explained in Example 2 while maintaining the polymerization between 25° to 30° C. for 2 hours. The resulting finely-divided polymer was recovered from the reaction product by filtration, followed by drying same at 50° C. in a circulating air oven. There were obtained 55 grams of white, granular poly(ethylene oxide) which had a reduced viscosity value in water of 15.6 (determined at a concentration of 0.1 gram of said poly(ethylene oxide) per 100 milliliters of water at 30° C.).

*Example 31*

The catalyst was prepared in the same manner as set forth in Example 1 except that the quantity of ethylene oxide employed was 40 weight percent of the quantity of calcium metal employed. The resulting catalyst slurry contained 1.0 gram of calcium (calculated as the metal) per 12.5 milliliters of catalyst slurry.

To a glass tube, there were charged 10.5 grams of propylene oxide, 4.5 grams of styrene oxide, 15 grams of toluene, and 3.1 milliliters of the above-prepared catalyst slurry (contained 0.25 gram of calcium calculated as the metal). The glass tube was sealed and rotated end over end at room temperature, i.e., about 22° C., for 65 hours. After this, the tube was inserted into an aluminum block which was gently agitated for an additional 65 hours at 90° C. The tube was then broken open and the reaction product was washed with about 100 milliliters of hexane. The resulting copolymer product was dried at room temperature under reduced pressure. There were obtained 3 grams of solid copolymer which had a reduced viscosity value of 0.33 in benzene.

In an analogous manner when an equal weight of 4-vinylcyclohexene oxide is substituted for styrene oxide under the operative condition set forth above, there is obtained a solid copolymer.

*Example 32*

To a glass tube, there were charged 5 grams of 1,2-epoxydodecane and 6.3 milliliters of the catalyst slurry prepared as set forth in Example 31, said catalyst slurry containing 0.5 gram of calcium calculated as the metal. The tube was sealed and rotated end over end for 18 hours at room temperature, i.e., about 22° C. After this, the tube was inserted into an aluminum block which was gently agitated for an additional 156 hours at 90° C. The tube was then broken open and the reaction product was washed with about 100 milliliters of hexane. The resulting homopolymer product was dried at 40° C. under reduced pressure. There were obtained 2 grams of a soft, white, solid polymer which had a reduced viscosity value in benzene of 0.07.

*Example 33*

Calcium hexammoniate was prepared by dissolving calcium metal in excess dry liquid ammonia and precipitating the product by addition of diethyl ether of diethylene glycol. The resulting catalyst, i.e., calcium hexammoniate, was recovered by filtration. Three grams of this material were added to a 2-liter glass autoclave which contained 204 grams of ethylene oxide and 600 grams of heptane. The resulting admixture was agitated by means of a magnetic stirrer. The polymerization reaction was conducted for 12.2 hours at 40° C. under an autoclave pressure of 19–20 p.s.i.g. The resulting finely-divided polymer was recovered from the reaction product via filtration, and dried under reduced pressure at room temperature. The conversion of monomer to polymer was 27 percent. This polymer had a reduced viscosity value in acetonitrile of 7.

Although the invention has been illustrated by the preceding examples, the invention is not to be construed as limited to the materials employed in the above exemplary examples, but rather, the invention encompasses the generic area as hereinbefore disclosed. Various modifications and embodiments of this invention can be made without departing from the spirit and scope thereof.

What is claimed is:

1. A metal amide-alcoholate characterized by the following formula:

$$H_2N—M—OR$$

wherein M is a member selected from the group consisting of magnesium, calcium, zinc, strontium, cadmium, and barium; and wherein R is a monovalent hydrocarbon radical selected from the group consisting of alkyl, cycloalkyl, aryl, alkaryl, aralkyl, and alkenyl.

2. Alkaline earth metal amide-alkylate.

3. Calcium amide-alkylate.

4. A process for producing alkaline earth metal amide-alcoholate which comprises contacting an alkaline earth metal hexammoniate with up to 1.0 mol per mol of said alkaline earth metal hexammoniate, of a compound selected from the group consisting of olefin oxides, saturated aliphatic hydrocarbon alcohols, and saturated aliphatic hydrocarbon aldehydes.

5. The process of claim 4 wherein the reaction of said alkaline earth metal hexammoniate with said compound is conducted in an excess liquid ammonia medium, under operative conditions sufficient to maintain said ammonia medium in an essentially liquid state, and subsequently evaporating from the resulting product mixture the excess liquid ammonia.

6. A process for producing alkaline earth metal amide-alcoholate which comprises contacting an alkaline earth metal hexammoniate with from about 0.2 to about 0.6 mol of olefin oxide per mol of alkaline earth metal hexammoniate, in an excess liquid ammonia medium, under operative conditions sufficient to maintain said ammonia medium in an essentially liquid state, and subsequently evaporating from the resulting product mixture the excess liquid ammonia.

7. The process of claim 6 wherein said olefin oxide is ethylene oxide.

8. The process of claim 6 wherein said olefin oxide is propylene oxide.

9. A process for producing alkaline earth metal amide-alcoholate which comprises contacting an alkaline earth metal hexammoniate with from about 0.2 to about 0.7 mol of saturated aliphatic hydrocarbon alcohol per mol of alkaline earth metal hexammoniate, in an excess liquid ammonia medium, under operative conditions sufficient to maintain said ammonia medium in an essentially liquid state, and subsequently evaporating from the resulting product mixture the excess liquid ammonia.

10. The process of claim 9 wherein said saturated aliphatic hydrocarbon alcohol is t-butyl alcohol.

11. A process for producing alkaline earth metal amide-alcoholate which comprises contacting an alkaline earth metal hexammoniate with from about 0.2 to about 0.7 mol of saturated aliphatic hydrocarbon aldehyde per mol of alkaline earth metal hexammoniate, in an excess liquid ammonia medium, under operative conditions sufficient to maintain said ammonia medium in an essentially liquid state, and subsequently evaporating from the resulting product mixture the excess liquid ammonia.

12. The process of claim 11 wherein said saturated aliphatic hydrocarbon aldehyde is acetaldehyde.

13. A process which comprises reacting a dialkylmetal, the metal portion of which is selected from the group consisting of magnesium, calcium, zinc, strontium, cadmium, and barium, with up to one mol per mol of said dialkylmetal, of a compound selected from the group consisting of olefin oxides and saturated aliphatic hydrocarbon alcohols, and subsequently contacting the resulting reaction product with excess ammonia for a period of time sufficient to produce a product which contains the corresponding metal amide-alcoholate.

References Cited in the file of this patent

UNITED STATES PATENTS

| | | |
|---|---|---|
| 2,131,120 | Schlack | Sept. 27, 1938 |
| 2,287,188 | Cohen | June 23, 1942 |
| 2,510,550 | Byrns | June 6, 1950 |
| 2,764,559 | Wilkins | Sept. 25, 1956 |